US012694424B2

(12) United States Patent
Chen et al.

(10) Patent No.: US 12,694,424 B2
(45) Date of Patent: Jul. 28, 2026

(54) GENERATING USER-SPECIFIC INCENTIVES BASED ON PREVIOUS ACTIVITY USING MACHINE-LEARNED LARGE LANGUAGE MODELS (LLMS)

(71) Applicant: Maplebear Inc., San Francisco, CA (US)

(72) Inventors: Changyao Chen, New York, NY (US); Jacob Jensen, Metuchen, NJ (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/932,041

(22) Filed: Oct. 30, 2024

(65) Prior Publication Data

US 2025/0139657 A1     May 1, 2025

Related U.S. Application Data

(60) Provisional application No. 63/594,401, filed on Oct. 30, 2023.

(51) Int. Cl.
*G06Q 30/02* (2023.01)
*G06Q 30/0207* (2023.01)
*G06Q 30/0601* (2023.01)

(52) U.S. Cl.
CPC ..... *G06Q 30/0224* (2013.01); *G06Q 30/0641* (2013.01)

(58) Field of Classification Search
CPC ........ G06Q 30/0641; G06Q 30/0207–30/0277
See application file for complete search history.

(56) References Cited

U.S. PATENT DOCUMENTS

| | | | |
|---|---|---|---|
| 10,210,536 B1 * | 2/2019 | Wai .................... | G06Q 30/0247 |
| 10,949,434 B1 * | 3/2021 | Tirupattur Saravanan ................. | |
| | | | G06F 16/2465 |
| 11,798,025 B1 * | 10/2023 | Ghosh ................ | G06Q 30/0243 |
| 12,373,738 B1 * | 7/2025 | White ................ | G06Q 30/0255 |
| 2015/0220999 A1 * | 8/2015 | Thornton ........... | H04M 15/805 |
| | | | 705/14.66 |
| 2018/0232762 A1 * | 8/2018 | Greene .............. | G06Q 30/0255 |
| 2019/0205905 A1 * | 7/2019 | Raghunathan ....... | G06V 10/764 |
| 2021/0118004 A1 * | 4/2021 | Qi ...................... | G06Q 30/0236 |
| 2021/0133807 A1 * | 5/2021 | Kini .......................... | G06N 3/08 |
| 2021/0365973 A1 * | 11/2021 | Guild ................ | G06Q 30/0235 |
| 2022/0198498 A1 * | 6/2022 | Huang ................ | G06Q 20/387 |
| 2022/0300999 A1 * | 9/2022 | Ortiz ...................... | H04L 63/10 |
| 2023/0021225 A1 * | 1/2023 | Weiss ................ | G01N 15/0205 |

(Continued)

*Primary Examiner* — Thuy N Nguyen
(74) *Attorney, Agent, or Firm* — Fenwick & West LLP

(57) ABSTRACT

An online system accesses user behavior data and incentive data collected for a user prior to a current time period. The online system trains a behavior prediction model to receive user behavior data for a user and an incentive and output an incentive score using the collected user behavior data. The online system receives one or more candidate incentives generated by an incentive generation model based on the accessed user behavior data and incentive data. The online system applies each candidate incentive to the behavior prediction model to generate an incentive prediction describing a degree of user interaction of the particular user with the online system responsive to offering the candidate incentive to the user. The online system offers one or more candidate incentives to the user based on the determined incentive predictions.

20 Claims, 6 Drawing Sheets

(56)           References Cited

U.S. PATENT DOCUMENTS

| | | | | |
|---|---|---|---|---|
| 2023/0252521 | A1* | 8/2023 | Vanderveld | G06N 5/01 |
| | | | | 705/14.66 |
| 2024/0267344 | A1* | 8/2024 | Mulligan | H04L 51/04 |
| 2024/0276079 | A1* | 8/2024 | Huffman | H04N 21/812 |
| 2024/0362676 | A1* | 10/2024 | Bangad | G06Q 30/0211 |

* cited by examiner

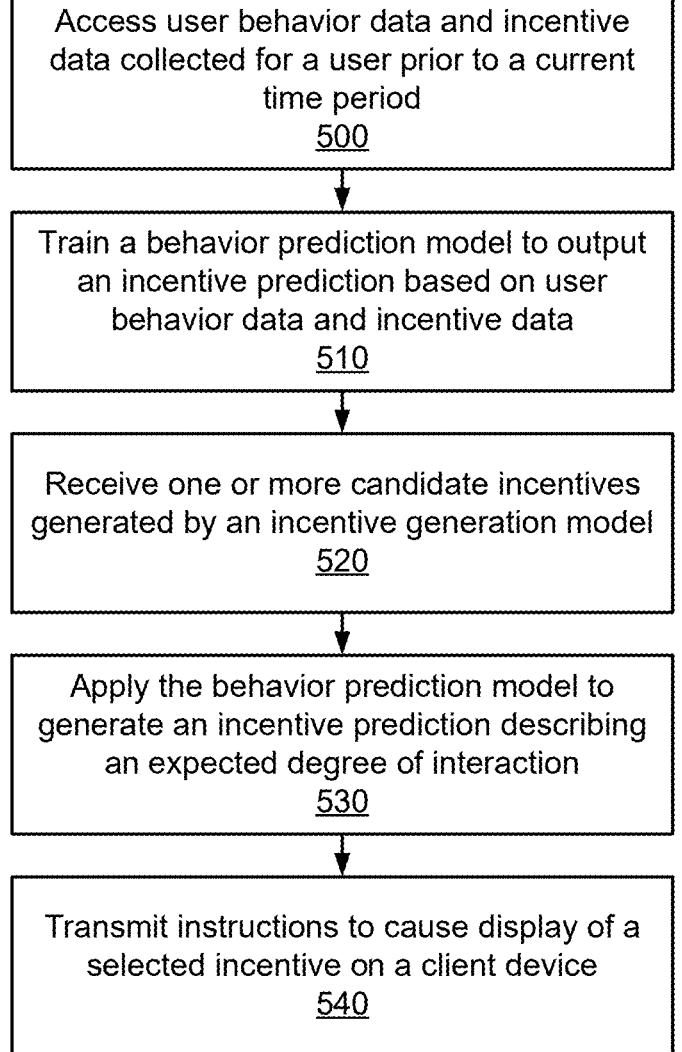

Access user behavior data and incentive data collected for a user prior to a current time period
500

Train a behavior prediction model to output an incentive prediction based on user behavior data and incentive data
510

Receive one or more candidate incentives generated by an incentive generation model
520

Apply the behavior prediction model to generate an incentive prediction describing an expected degree of interaction
530

Transmit instructions to cause display of a selected incentive on a client device
540

FIG. 5

GENERATING USER-SPECIFIC INCENTIVES BASED ON PREVIOUS ACTIVITY USING MACHINE-LEARNED LARGE LANGUAGE MODELS (LLMS)

CROSS-REFERENCE TO RELATED APPLICATIONS

This application claims the benefit of U.S. Provisional Patent Application No. 63/594,401, filed on Oct. 30, 2023, which is incorporated herein by reference in its entirety.

BACKGROUND

An online system is a computing platform, for example, that connects users and retailers. A user can place an order for purchasing items, such as groceries, from participating retailers via the online system, with the shopping being done by a personal shopper. The online system or retailers within the online system may offer discounts on a set of items or incentives for a user to interact with the online system. However, conventional systems generate these coupons using a fixed framework as it is difficult to associate the content of the coupons with predicted user engagement. Such a method may generate coupons in a sub-optimal way with respect to the likelihood of getting redeemed.

SUMMARY

In accordance with one or more aspects of the disclosure, an online system accesses user behavior data and incentive data collected for users prior to a current time period. The collected incentive data describes previous incentives offered to the users and the collected behavior data describes a degree of user interaction with the online system in response to receiving those previous incentives. The online system trains a behavior prediction model configured to receive user behavior data for a user and an incentive and output an incentive prediction using the collected user behavior data and incentive data. The online system receives one or more candidate incentives generated by an incentive generation model based on the accessed user behavior data. In one or more embodiments, the incentive generation model is a multi-modal large language model (LLM). The online system applies each candidate incentive and/or behavior data for a particular user to the behavior prediction model to generate an incentive prediction. Each incentive prediction describes a likelihood that offering the candidate incentive to the user would cause the user to engage with the online system. The online system offers one or more candidate incentives to the user based on the determined incentive scores.

BRIEF DESCRIPTION OF THE DRAWINGS

FIG. 5 is a flowchart for a method of generating an incentive for a behavior data and incentive data collected for the user within the online system, in accordance with some embodiments.

DETAILED DESCRIPTION

Figure 1A:
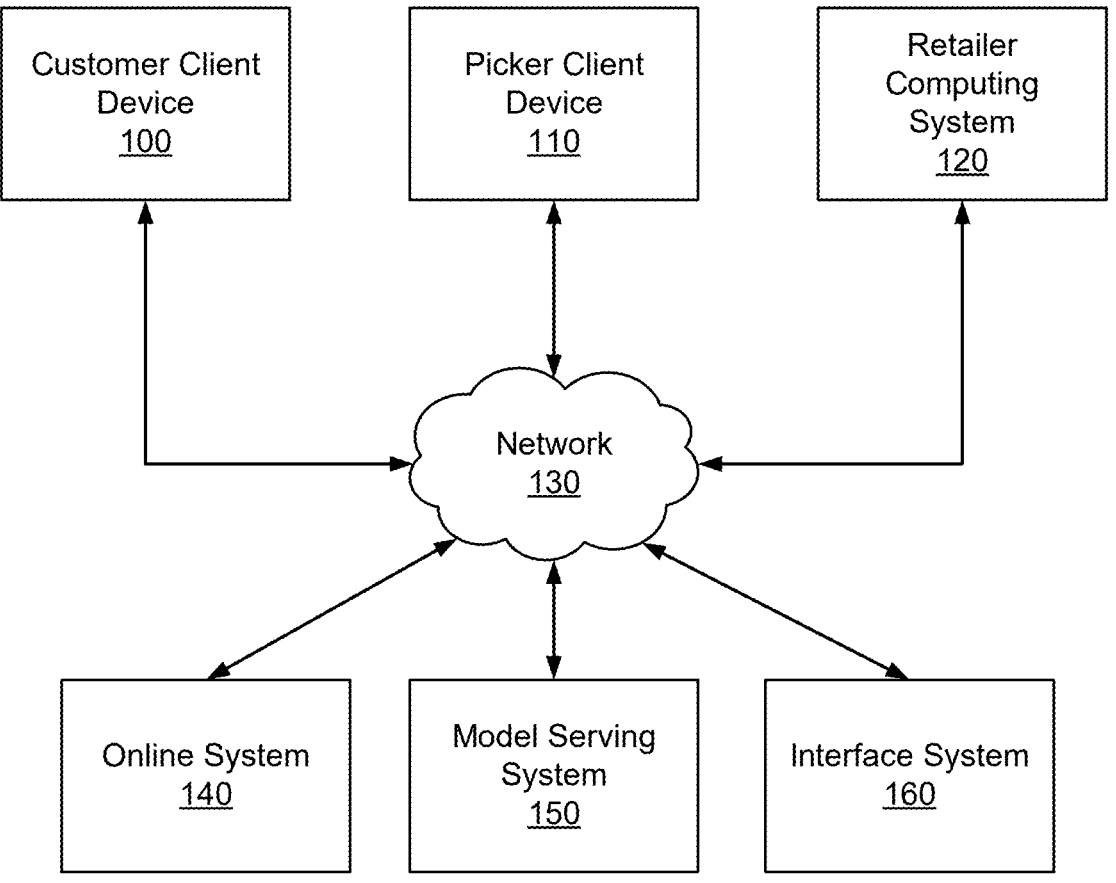
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item", as used herein, means a good or product that can be provided to the customer through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provides portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

The model serving system 150 receives one or more requests from the online system 140 to perform inference tasks using machine-learned models. The inference tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbot applications, and the like. In one or more embodiments, the language model is configured as a transformer neural network architecture. Specifically, the transformer model is coupled to receive sequential data tokenized into a sequence of input tokens and generates a sequence of output tokens depending on the inference task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many inference tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units (GPUs) for training or deploying deep neural network models. In one instance, the LLM may be trained and hosted on a cloud infrastructure service. The LLM may be trained by the online system 140 or entities/systems different from the online system 140. An LLM may be trained on a large amount of data from various data sources. For example, the data sources include websites, articles, posts on the web, and the like. From this massive amount of data coupled with the computing power of LLMs, the LLM is able to perform various inference tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

In one or more embodiments, the online system 140 described herein takes advantage of the technical capabilities of LLMs and/or multi-modal LLMs to generate candidate incentives (e.g., text, image, or video of the inventive) for a user based on the user behavior data for the user. The incentives can be coupons, e-mails, marketing messages, or the like. The user behavior data captures a sequence of activities the user has performed over time in conjunction with the online system 140. The goal of the incentives may be to improve the likelihood the user interacts with the online system 140 with respect to a desired objective (e.g., increase in the frequency of purchases). Specifically, the online system 140 may have access to a significant amount of data that captures when the users were presented with incentives and how the user responded afterwards. The data may be useful to extract how users respond to different types of incentives and for designing new incentives for a given user. In one or more embodiments, users can opt-in to receive additional incentives and the online system 140 may provide additional targeted incentives for users who opt-in.

Thus, in one or more embodiments, the online system 140 uses the data to train a behavior prediction model that predicts how a user will respond to an incentive given the user's behavior so far and the content of the incentive. Also, the online system 140 also leverages the generative capabilities of a multi-modal LLM as an incentive generation model to create one or more candidate incentives given the user behavior data for a particular user and additional information (e.g., goal for the incentive, duration or frequency of the incentive) in the prompt. In one or more embodiments, the behavior prediction model is used to predict the responses of a user to these one or more candidate incentives, so that an incentive can be selected for presentation to the user. In other embodiments, the behavior prediction model can be used as a reward model to further train or fine-tune the incentive generation model.

In one or more embodiments, the inference task for the model serving system 150 can primarily be based on reasoning and summarization of knowledge specific to the online system 140, rather than relying on general knowledge encoded in the weights of the machine-learned model of the model serving system 150. Thus, one type of inference task may be to perform various types of queries on large amounts of data in an external corpus in conjunction with the machine-learned model of the model serving system 150. For example, the inference task may be to perform question-answering, text summarization, text generation, and the like based on information contained in the external corpus.

In one or more embodiments, the online system 140 is connected to an interface system 160. The interface system 160 receives an external corpus of data from the online system 140 and builds a structured index over the data using another machine-learned language model or heuristics. The interface system 160 receives one or more task requests from the online system 140 based on the external data. The interface system 160 constructs one or more prompts for input to the model serving system 150. A prompt may include the task request of the user and context obtained from the structured index of the external data. In one or more instances, the context in the prompt includes portions of the structured indices as contextual information for the query. The interface system 160 obtains one or more responses to the query from the model serving system 150 and synthesizes a response. While the online system 140 can generate a prompt using the external data as context, oftentimes, the amount of information in the external data exceeds prompt size limitations configured by the machine-learned language model. The interface system 160 can resolve prompt size limitations by generating a structured index of the data and offers data connectors to external data and provides a flexible connector to the external corpus.

Figure 1B:
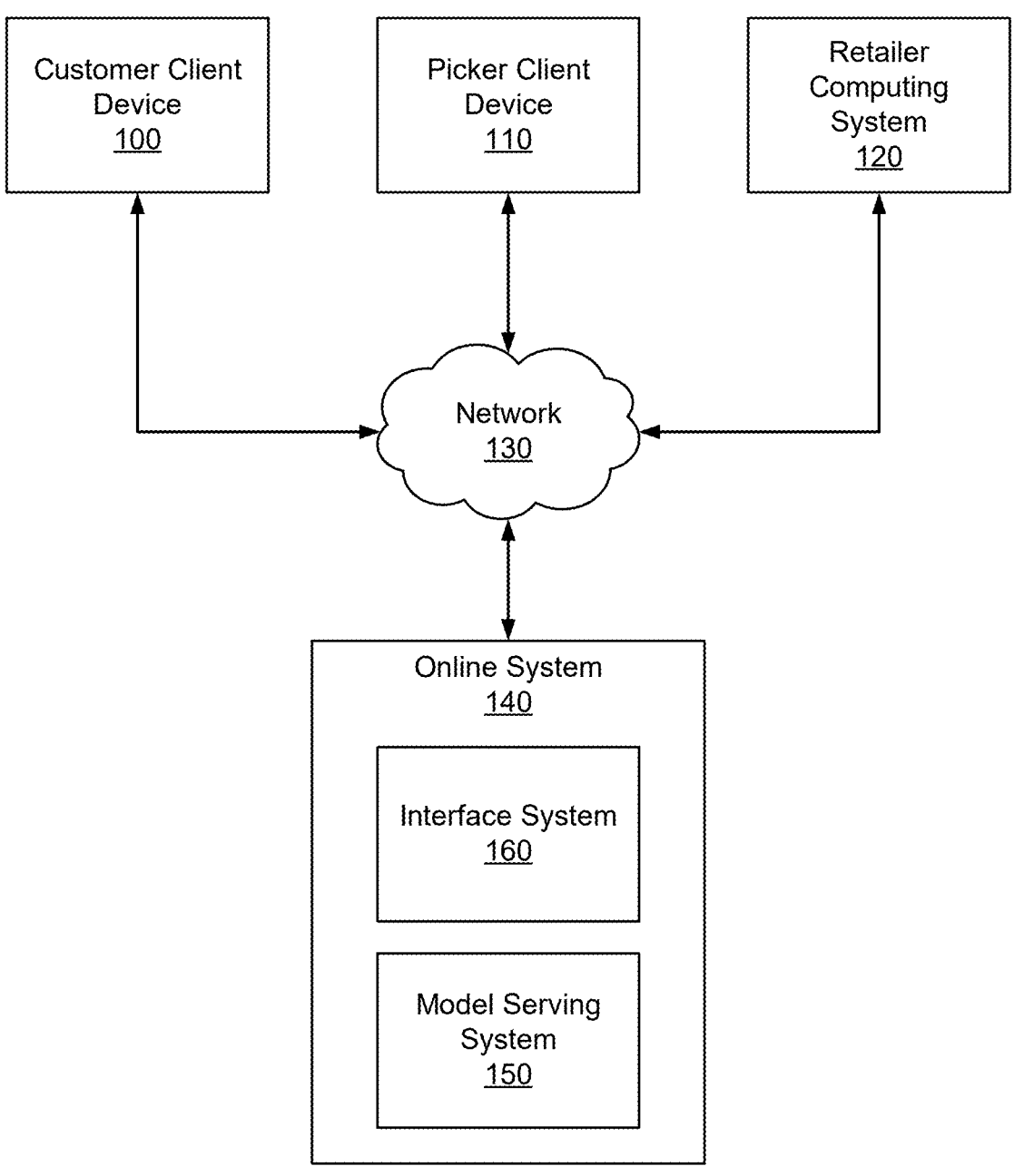
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a customer client device 100, a picker client device 110, a retailer computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 are each managed by an entity separate from the entity managing the online system 140. In one or more embodiments, as illustrated in the example system environment in FIG. 1B, the model serving system 150 or the interface system 160 is managed and deployed by the entity managing the online system 140.

Figure 2:
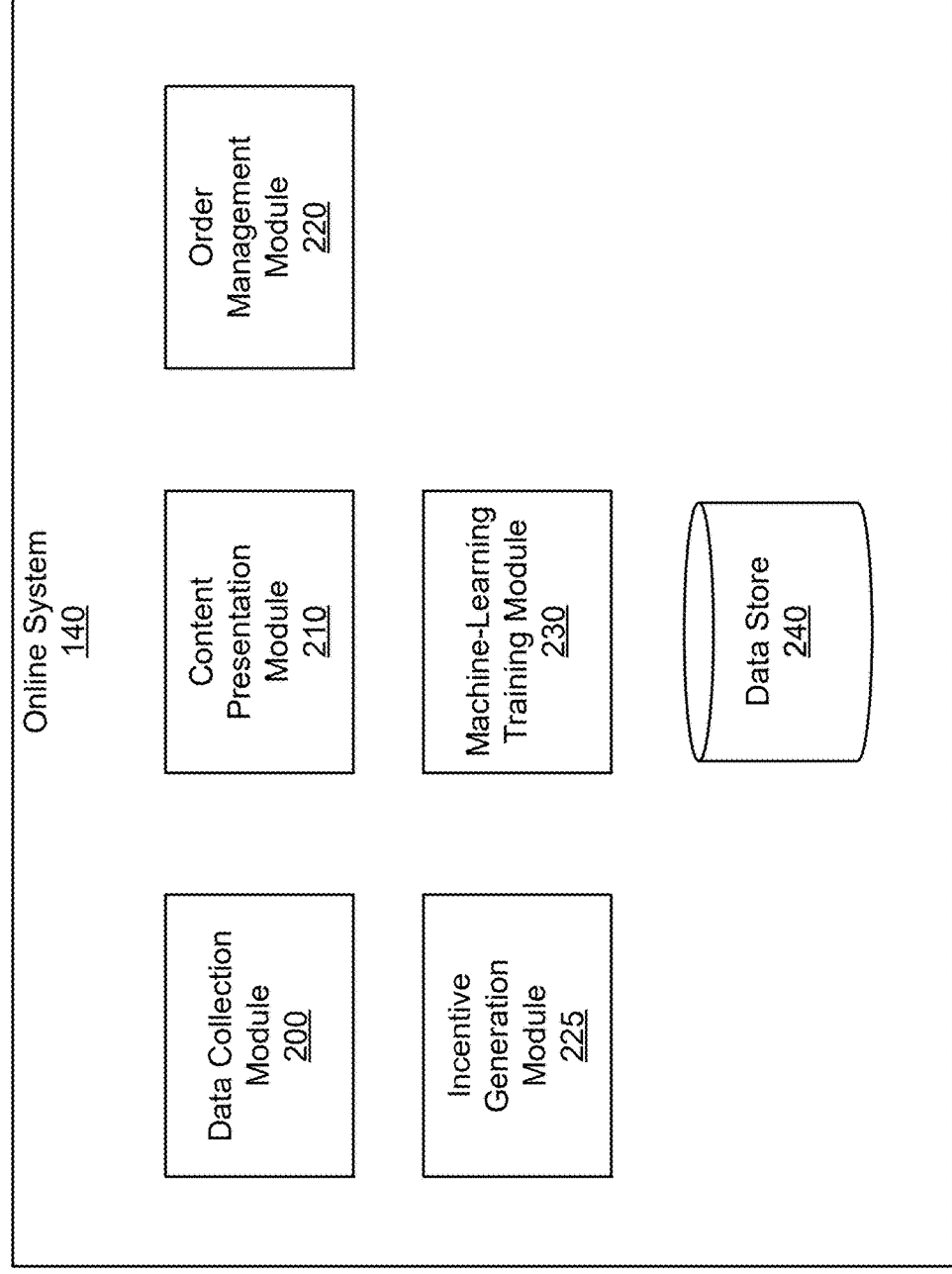
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, an incentive generation module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of picker users. For example, the picker data for a picker may include the picker's name, the picker's location, how often the picker has services orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

In one or more embodiments, the data collection module 200 also collects communication data, which is different types of communication between shoppers and users of the online system 140. For example, the data collection module 200 may obtain text-based, audio-call, video-call based communications between different shoppers and users of the online system 140 as orders are submitted and fulfilled. The data collection module 200 may store the communication information by individual user, individual shopper, per geographical region, per subset of users having similar attributes, and the like.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In one or more embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

In one or more embodiments, the content presentation module 210 receives one or more recommendations for presentation to the customer while the customer is engaged with the ordering interface. The list of ordered items of a customer may be referred to as a basket. As described in conjunction with FIGS. 1A and 1B, the recommendations are generated based on the inferred purpose of the basket of the customer and include one or more suggestions to the customer to better fulfill the purpose of the basket.

In one instance, the recommendations are in the form of one or more equivalent baskets that are modifications to an existing basket that serve the same or similar purpose as the original basket. The equivalent basket is adjusted with respect to metrics such as cost, healthiness, whether the basket is sponsored, and the like. For example, an equivalent basket may be a healthier option compared to the existing basket, a less expensive option compared to the existing basket, and the like. The content presentation module 210 may present the equivalent basket to the customer via the ordering interface with an indicator that states how an equivalent basket improves or is different from the existing basket (e.g., more cost-effective, healthier, sponsored by a certain organization). The content presentation module 210 may allow the customer to swap the existing basket with an equivalent basket.

In one instance, when the basket includes a list of edible ingredients, the recommendations are in the form of a list of potential recipes the ingredients can fulfill, and a list of additional ingredients to fulfill each recipe. The content presentation module 210 may present each suggested recipe and the list of additional ingredients for fulfilling the recipe to the customer. The content presentation module 210 may allow the customer to automatically place one or more additional ingredients in the basket of the customer.

The order management module 220 that manages orders for items from customers. The order management module 220 receives orders from a customer client device 100 and offers the orders to pickers for service based on picker data. For example, the order management module 220 offers an order to a picker based on the picker's location and the location of the retailer from which the ordered items are to be collected. The order management module 220 may also offer an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to offer an order to a picker based on a delivery timeframe requested by the customer with the order. The order management module 220 computes an estimated amount of time that it would take for a picker to collect the items for an order and deliver the ordered item to the delivery location for the order. The order management module 220 offers the order to a picker at a time such that, if the picker immediately services the order, the picker is likely to deliver the order at a time within the timeframe. Thus, when the order management module 220 receives an order, the order management module 220 may delay in offering the order to a picker if the timeframe is far enough in the future.

When the order management module 220 offers an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 also transmits navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In one or more embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The incentive generation module 225 generates content for incentives in conjunction with a LLM. For example, the incentives may be coupons with proposed reductions on certain items or an incentive for a user to otherwise engage with the online system 140. The incentive generation module 225 receives, from retailers or the online system 140 itself, a set of parameters for generating an incentive to be distributed to users. In one or more embodiments, the incentive parameters include a discount to be offered, the types of items affected by the discount, a duration, characteristics of a customer to whom the coupon should be distributed, and one or more desired purchase activities or goals (e.g., placing an order every week for the next 12 months) for the user. The incentive generation module 225 transmits the incentive parameters to the model serving system 150, where an LLM generates a candidate incentive based on the parameters.

The incentive generation module 225 may generate user-specific incentives based on previous data collected for the user. Accordingly, the incentive generation module 225 stores a record of each user's past behavior within the online system prior to a current time period, hereafter referred to as "user behavior data." User behavior data includes, but is not limited to, a number of items acquired by the user, a frequency with which the user acquires items, categories of items the user typically purchases regularly, and/or a number of days between each of the user's acquisitions. For example, the user behavior data for a particular user A may indicate median days between consecutive purchases for the user either in tabular or numerical form or in natural language text. The incentive generation module 225 generates a numerical value representing each component of the user behavior data and/or creates an embedding representing the user behavior data.

Additionally, the incentive generation module 225 stores "user incentive data" received by the user prior to the current time period. The incentive generation module 225, extracts various elements of one or more incentives offered to a user including, but not limited to, the type of items, type of discount, duration, brand being promoted, etc. The incentive generation module 225 generates an embedding representing user incentive data. For example, the incentive generation module 225 extracts text and image data from coupons and marketing materials sent to a user in the past and generates an embedding based on the extracted text and features. In one or more embodiments, the embedding for the user incentive data may be generated by applying a machine-learned embedding model, a LLM, or another transformer-based model to the text and images extracted for the user incentive data.

In some embodiments, the incentive generation module 225 transmits the user behavior data and incentive data to the model serving system 150, which applies an LLM to extract information from the user behavior data and/or incentive data. From the user behavior data, the LLM may extract information from the user's purchase history, for example that the user is only interested in organic items or that the user purchases dairy products every two weeks. From incentive data, the LLM may extract information summarizing the contents of the previous incentives received by the user before the current time period.

The incentive generation module 225 inputs embeddings of one or more candidate incentives and user behavior data collected for a user to a machine-learning model as well as any additional description about these inputs, to a model hereafter referred to as a "behavior prediction model," trained to generate an incentive prediction given these inputs. The incentive prediction indicates a prediction of how a respective candidate incentive will affect a user's future activity within the online system 140. In one or more embodiments, the behavior prediction model is an LLM stored at the model serving system 150.

Figure 3:
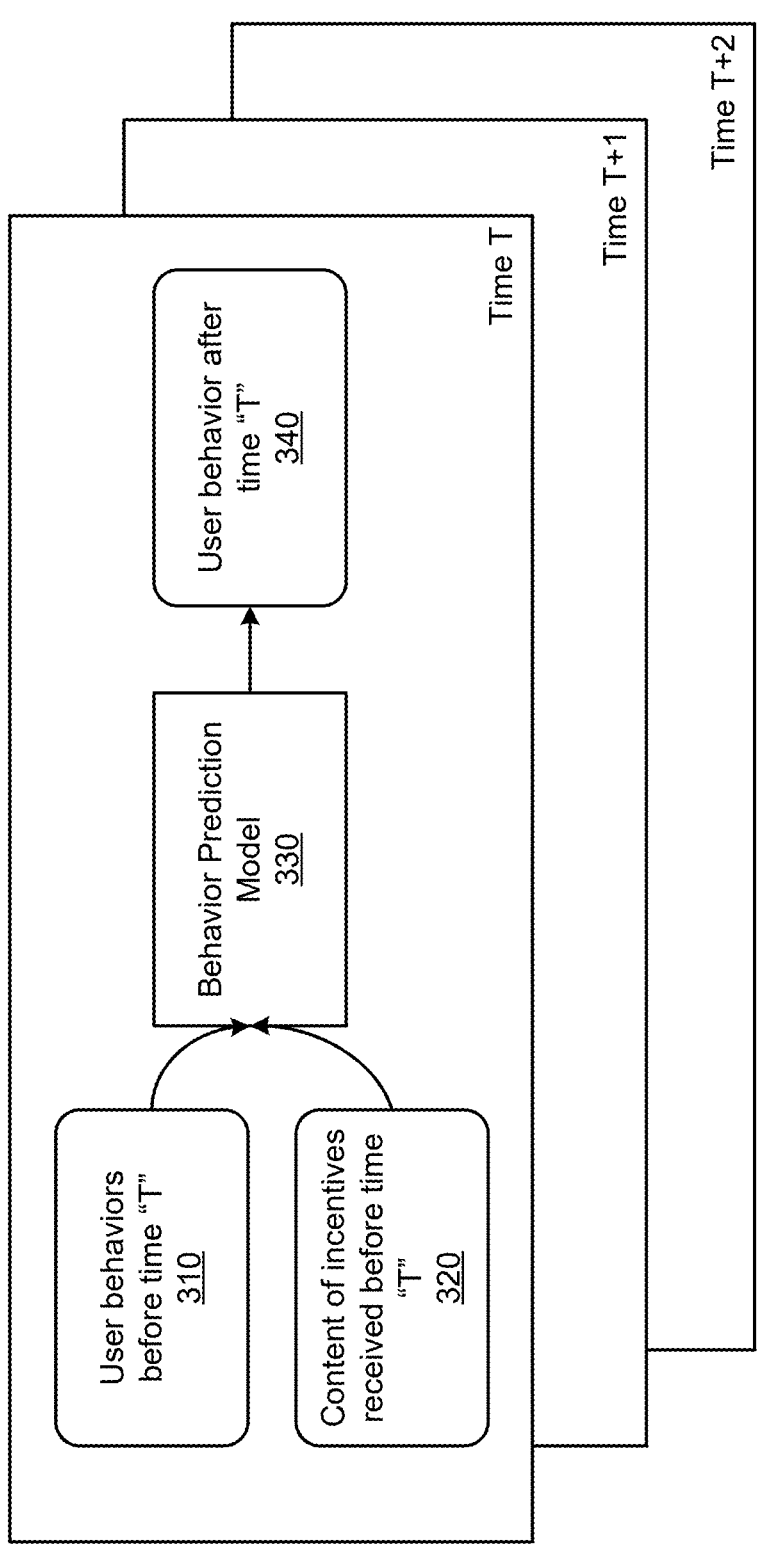
FIG. 3 illustrates a training process of a behavior prediction model, in accordance with one or more embodiments.

FIG. 3 illustrates a training process of a behavior prediction model, in accordance with one or more embodiments. In one instance, parameters of the behavior prediction model are trained based on a training dataset of user behavior data and user incentive data. Each entry of the training dataset includes features extracted from incentive data and user behavior data such that the model identifies features of incentive data that resulted in increased user interaction of such a user with the online system 140. In one instance, parameters of the behavior prediction model are trained based on pairs of creatives for marketing material (e.g., coupons) and a respective score. For a pair of creatives, a human annotator or a separate machine-learned model assigns a score to each creative indicating the degree of desired user behavior. The parameters of the behavior prediction model are trained to reduce a loss function that indicates a difference between the scores for the pair.

In yet another instance, the behavior prediction model may be based on a pre-trained LLM or transformer-based generation architecture that may have parameters further fine-tuned based on user behavior data and incentive data and corresponding incentive predictions corresponding to the activity of the user (e.g., purchase behavior, days between purchase, expected revenue due to user, etc.) within the online system 140. In the example shown in FIG. 3, an example training entry may include, for a particular user, user behavior data before a time "T" 310 and incentive data characterizing content of incentives before time "T" 320 that the user was presented with. For example, the inputs may be in the form of a training prompt:

---

"For customer ID 90493 <quantitative or qualitative description of user behavior data or embedding characterizing user behavior data>, the customer was presented with the coupon "$20 off every total $100 purchase." Predict how often the customer will purchase during the next 12 months after the coupon was presented."

---

The training entry also includes known user behavior data after time "T" 340 characterizing the user's behavior at times "T+1," "T+2," and so on, after the user was exposed to the one or more incentives. For example, the known user behavior data indicates the user purchased on an average every three weeks for the next 12 months after time "T."

The incentive generation module 225 trains or fine-tunes the parameters of the behavior prediction model 330 by applying the behavior prediction model 330 to the user behavior data 310 and the incentive data 320 to generate estimated outputs (e.g., or a prompt including this information). The incentive generation module 225 computes a loss function indicating a difference between the estimated outputs and the known user behavior data after time "T" 340. The incentive generation module 225 updates parameters of the behavior prediction model 330 to reduce the loss function.

Accordingly, during the inference process after a training process has been completed, the incentive generation module 225 may implement the behavior prediction model to evaluate the effect of candidate incentives before they are presented to a user. The incentive generation module 225 may input incentive data for one or more candidate incentives and user behavior data to the behavior prediction model to evaluate the impact that each candidate incentive will have on the user's future purchase activity in the online system 110.

For example, the behavior prediction model may predict that a candidate coupon will increase the likelihood that a user will interact with the online system 140 based on behavior data collected in response to previous coupons. Alternatively, the behavior prediction model may predict that a candidate coupon will not incentivize a user to interact with the online system 140 based on behavior data collected in response to previous coupons. In one or more embodiments, the behavior prediction model generates a numerical score describing a likelihood that a given incentive will impact the activity of a user at the online system 140 or an incentive prediction in natural language characterizing the user's expected purchase activity in response to being presented with the one or more candidate incentives.

Figure 4:
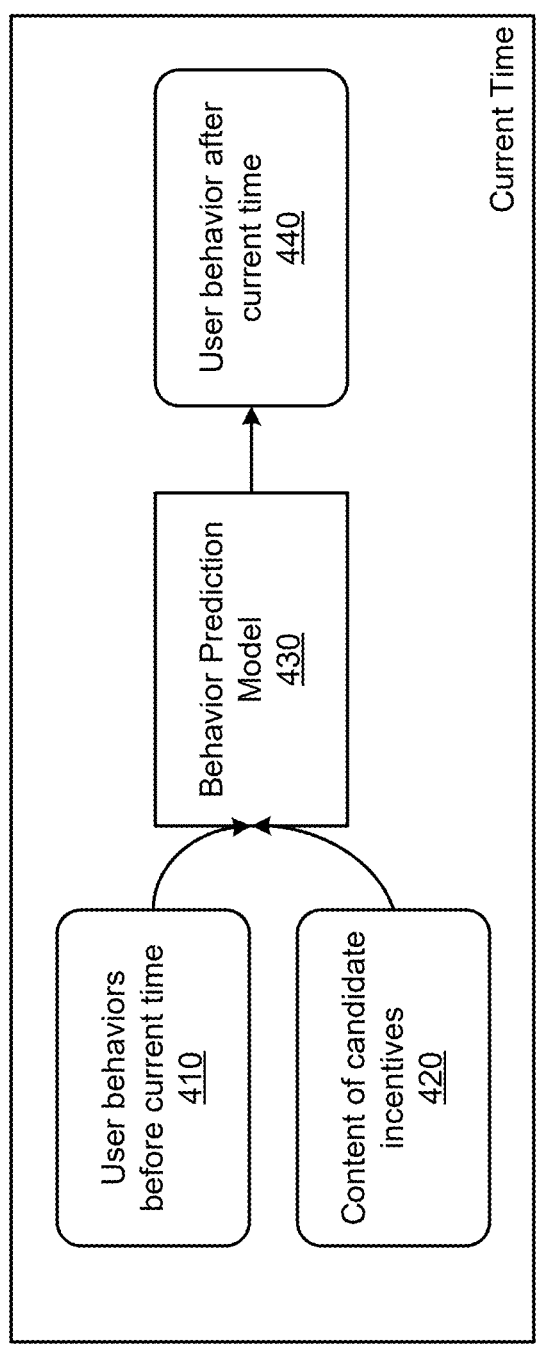
FIG. 4 illustrates an inference process of the behavior prediction model, in accordance with one or more embodiments.

FIG. 4 illustrates an inference process of the behavior prediction model, in accordance with one or more embodiments. As illustrated in the example of FIG. 4, the incentive generation module 225 obtains the user behavior data for a particular user that characterizes the behaviors of the user before a current time 410. The incentive generation module 225 also obtains the content of one or more candidate incentives 420 for the user. The incentive generation module 225 applies the trained behavior prediction model 430 to the user behavior data and the incentive data 420 to generate the predicted user behavior after the current time 440 if the user was presented with the one or more candidate incentives. As an example, the input may be in the form of prompt:

---

"Tell me, for customer ID 12345 who orders milk every 2 weeks (or any embedding characterizing the user's activity), if we send her <coupon 1: milk from ABC Co. every 2 weeks, coupon 2: $20 off of every $100 purchased, coupon 3: 15% discount or embeddings characterizing these coupons> how often (measured in times per month) will she shop during the next 12 months for each of these three options?"

---

The response may indicate:

---

"For coupon 1, expect 2 times per month, for coupon 2, expect 1 time per month, for coupon 3, expect 0.5 times per month."

---

The incentive generation module 225 may present a selected incentive to a user based on the incentive predictions generated by the behavior prediction model. In one or more embodiments, the incentive generation module 225 presents the candidate incentive with the highest degree of predicted purchase behavior as indicated in the incentive predictions. In another embodiment, the incentive generation module 225 stores all candidate incentives with a predicted activity above a threshold and periodically offers one or more of the stored candidate incentives to a user.

In one or more embodiments, the incentive generation module 225 transmits embeddings of user behavior data and incentive parameters to the model serving system 150 to generate candidate incentives to be offered to a user. The model serving system 150 may apply an LLM, hereafter referred to as the incentive generation model, to the transmitted embeddings to generate candidate incentives for a given user of the online system 140. The incentive generation model generates one or more candidate incentives, for example candidate coupons or the creative (e.g., text, images, video) for the candidate coupons, that are likely to increase activity of the user within the online system 140 based on the content of previous incentives transmitted to the user and the user's behavior data in response to those previous incentives. Accordingly, the incentive generation model may be trained based on a training dataset of previous incentives, where each entry includes features extracted for a user based on user behavior, one or more incentive parameters desired for the generated incentive, and coupon creatives that induced desired behavior from the user.

For example, the inputs to the incentive generation model may be in the form of a prompt:

---

"What is the best coupon to send to a customer with ID 12345 <insert quantitative or qualitative description of user's behavior data or embedding characterizing user's behavior data> if we want the user to spend $500 in the next 3 months?"

---

The response from the incentive generation model may be:

---

"A coupon with the text "10% off every purchase of $100!" along with an image of ice cream since the customer regularly orders ice cream every 2 weeks."

---

In some embodiments, the incentive generation module 225 applies the behavior prediction model to improve the accuracy of the incentive generation model. The incentive generation module 225 may receive candidate incentives generated by the incentive generation model at the model serving system 150 and input those candidate incentives to the behavior prediction model. For each candidate incentive, the behavior prediction model generates an incentive prediction based on features extracted from the candidate incentive and user behavior data for a given user. As described above, the incentive prediction may be a numerical score describing a likelihood that an incentive(s) in the candidate incentive will encourage a user to interact with the online system 140 or may characterize the user's future behavior in natural language. The incentive generation module 225 may compare the incentive predictions for a set of candidate incentives and identify the candidate incentive more likely to result in the user interacting with the online system 140, that is, the candidate incentive with the highest estimated incentive prediction. The incentive generation module 225 may provide the selected incentive to the user. The incentive generation module 225 may update the training dataset upon which the incentive generation model was trained and iteratively retrain the incentive generation model so that future candidate incentives generated by the model produce increased incentive scores.

In one or more embodiments, the incentive generation module 225 applies a reinforced learning framework where the behavior prediction model acts as a reward model for fine-tuning the incentive generation model during the training or fine-tuning process of the incentive generation model. Accordingly, the reward model, which is the behavior prediction model, is trained to receive an embedding of a candidate incentive and user behavior data as an input and output a reward score indicating a degree of desired user purchase behavior, which may correspond to the incentive prediction as described above.

Given the trained reward model, the incentive generation model 225 transmits user behavior data collected for a user to a prior version of the incentive generation model and a fine-tuning version of the incentive generation model, both of which generate a candidate coupon or creative for a candidate coupon for the user (e.g., in the form of prompts). The prior version of the incentive generation model may be a pre-trained LLM or pre-trained generation model configured to generate creatives for coupons or other marketing material. The incentive generation model 225 inputs the candidate incentive generated by the fine-tuning version of the incentive generation model and the user behavior data to the reward model, which generates a reward score. The incentive generation module 225 further determines a KL divergence between the candidate incentive generated by the prior incentive generation model and the fine-tuning incentive generation model.

The incentive generation module 225 backpropagates one or more terms obtained from the loss function to parameters of the fine-tuning material generation module 225 based on the reward score generated by the reward model and the determined KL divergence score for the candidate coupon. In alternate embodiments, the incentive generation model generates many candidate incentives and the incentive generation module 225 applies the behavior prediction to select the candidate incentive that will be most effective in encouraging a particular user to interact with the online system 140.

In this way, the behavior prediction model can continuously provide feedback to the incentive generation model such that the incentive generation model can create incentives for a given user in a way that provides the most "reward" or likelihood of desired interaction as predicted by the behavior prediction model.

The machine learning training module 230 trains machine learning models used by the online system 140. For example, the machine learning module 230 may train the item selection model, the availability model, or any of the machine-learned models deployed by the model serving system 150. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

FIG. 5 is a flowchart for a method of generating an incentive for a behavior data and incentive data collected for the user within the online system, in accordance with some embodiments. Alternative embodiments may include more, fewer, or different steps from those illustrated in FIG. 5, and the steps may be performed in a different order from that illustrated in FIG. 5. These steps may be performed by an online system (e.g., online system 140). Additionally, each of these steps may be performed automatically by the online system without human intervention.

The online system 140 accesses 500 user behavior data and incentive data that are collected prior to a current time period. In one or more embodiments, the collected incentive data may describe previous incentives offered to users of the online system 140 and the collected user behavior data may describe a degree of user interaction of the users with the online system 140 in response to receiving the previous incentives. The online system 140 trains 510 a behavior prediction model configured to receive user behavior data for a user and an incentive and output an incentive prediction using the collected user behavior data and incentive data. The online system 140 receives 520 one or more candidate incentives generated by an incentive generation model for a particular user. The online system 140 applies 530, to each candidate incentive and user behavior data for the particular user, the behavior prediction model to generate an incentive prediction describing a degree of interaction of the particular user with the online system 140 in response to receiving the respective candidate incentive. The online system 140 transmits 540, based on the incentive predictions for the one or more candidate incentives, instructions to cause display of a selected incentive to the particular user or another user on a client device.

In one or more embodiments, the online system 140 collects and obtains feedback on how the user interacted with the selected incentive after the user was presented with the selected incentive. For example, the user may have clicked on the incentive, and purchased the items promoted in the incentive. This data for one or more users is incorporated as additional training data for training the parameters of the behavior prediction model, similar to that described in conjunction with FIG. 3.

ADDITIONAL CONSIDERATIONS

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
accessing user behavior data and incentive data obtained prior to a current time, wherein the obtained incentive data describes previous incentives offered to users of an online system and the obtained user behavior data describes a degree of user interaction of the users with the online system in response to receiving the previous incentives;
training a behavior prediction model configured to receive user behavior data for a user and an incentive, and further configured to output an incentive prediction using the obtained user behavior data and incentive data, the behavior prediction model configured as a transformer architecture, and wherein training the behavior prediction model further comprises:
obtaining at least a training entry for known user behavior data for a particular user and known incentive data describing contents of incentives the particular user was presented with, and known interaction data describing how the user interacted with the incentives at a later time,
computing a loss function indicating a difference between estimated outputs and the known interaction data, wherein the estimated outputs are generated by applying the behavior prediction model to the known user behavior data and the known incentive data, and
backpropagating one or more terms obtained from the loss function to update parameters of the behavior prediction model;
receiving one or more candidate incentives generated by an incentive generation model for a particular user, wherein the incentive generation model is configured as another transformer architecture;
applying, to each candidate incentive and user behavior data for the particular user, the behavior prediction model to generate an incentive prediction describing a degree of interaction of the particular user with the online system in response to receiving the respective candidate incentive; and
transmitting, based on the incentive predictions determined for the one or more candidate incentives, instructions to cause display of a selected incentive to the particular user or another user on a client device.

2. The method of claim 1, wherein the selected incentive is a candidate incentive from the one or more candidate incentives that is associated with a highest degree of predicted interaction with the online system with respect to a desired objective for the particular user.

3. The method of claim 1, further comprising:
accessing a version of the incentive generation model with a fixed set of parameters;
generating one or more initial incentives using the version of the incentive generation model;
computing a loss function, wherein the loss function includes a first loss indicating a reward for the one or more candidate incentives obtained from the incentive predictions generated by the behavior prediction model, and a second loss indicating a divergence between content of the one or more initial incentives and the one or more candidate incentives; and
updating the parameters of the incentive generation model to reduce the loss function.

4. The method of claim 1, wherein at least one or both of the behavior prediction model and the incentive generation model is configured as a generative transformer architecture with one or more attention layers.

5. The method of claim 1, wherein the incentive prediction for each candidate incentive indicates one or a combination of an expected frequency of purchase by the particular user for a time period or a total amount of purchase by the particular user for a time period.

6. The method of claim 1, further comprising:
obtaining embeddings for the one or more candidate incentives mapping the one or more candidate incentives to a latent space; and
obtaining embeddings for the user behavior data for the particular user, and
wherein applying the behavior prediction model further comprises inputting the embeddings for the one or more candidate incentives and the embeddings for the user behavior data for the particular user to the behavior prediction model.

7. The method of claim 1, wherein the selected incentive is one or a combination of a coupon, an e-mail, or a marketing message.

8. The method of claim 1, further comprising:
obtaining interaction data of the particular user or the another user on the selected incentive;
generating additional training data from the interaction data; and
fine-tuning parameters of the behavior prediction model using the additional training data.

9. A non-transitory computer-readable storage medium storing computer instructions, when executed by one or more processors, cause the one or more processors to:
access user behavior data and incentive data obtained prior to a current time, wherein the obtained incentive data describes previous incentives offered to users of an online system and the obtained user behavior data describes a degree of user interaction of the users with the online system in response to receiving the previous incentives;
train a behavior prediction model configured to receive user behavior data for a user and an incentive, and further configured to output an incentive prediction using the obtained user behavior data and incentive data, the behavior prediction model configured as a transformer architecture, wherein the instructions to train the behavior prediction model further cause the one or more processors to:
obtain at least a training entry for known user behavior data for a particular user and known incentive data describing contents of incentives the particular user was presented with, and known interaction data describing how the user interacted with the incentives at a later time,
compute a loss function indicating a difference between estimated outputs and the known interaction data, wherein the estimated outputs are generated by applying the behavior prediction model to the known user behavior data and the known incentive data, and
backpropagating one or more terms obtained from the loss function to update parameters of the behavior prediction model;

receive one or more candidate incentives generated by an incentive generation model for a particular user, wherein the incentive generation model is configured as another transformer architecture;

apply, to each candidate incentive and user behavior data for the particular user, the behavior prediction model to generate an incentive prediction describing a degree of interaction of the particular user with the online system in response to receiving the respective candidate incentive; and transmit, based on the incentive predictions determined for the one or more candidate incentives, instructions to cause display of a selected incentive to the particular user or another user on a client device.

10. The non-transitory computer-readable storage medium of claim 9, wherein the selected incentive is a candidate incentive from the one or more candidate incentives that is associated with a highest degree of predicted interaction with the online system with respect to a desired objective for the particular user.

11. The non-transitory computer-readable storage medium of claim 9, wherein the computer instructions further cause the one or more processors to:

access a version of the incentive generation model with a fixed set of parameters;

generate one or more initial incentives using the version of the incentive generation model;

compute a loss function, wherein the loss function includes a first loss indicating a reward for the one or more candidate incentives obtained from the incentive predictions generated by the behavior prediction model, and a second loss indicating a divergence between content of the one or more initial incentives and the one or more candidate incentives; and update the parameters of the incentive generation model to reduce the loss function.

12. The non-transitory computer-readable storage medium of claim 9, wherein at least one or both of the behavior prediction model and the incentive generation model is configured as a generative transformer architecture with one or more attention layers.

13. The non-transitory computer-readable storage medium of claim 9, wherein the incentive prediction for each candidate incentive indicates one or a combination of an expected frequency of purchase by the particular user for a time period or a total amount of purchase by the particular user for a time period.

14. The non-transitory computer-readable storage medium of claim 9, wherein the computer instructions further cause the one or more processors to:

obtain embeddings for the one or more candidate incentives mapping the one or more candidate incentives to a latent space; and obtain embeddings for the user behavior data for the particular user, and wherein applying the behavior prediction model further comprises inputting the embeddings for the one or more candidate incentives and the embeddings for the user behavior data for the particular user to the behavior prediction model.

15. The non-transitory computer-readable storage medium of claim 9, wherein the selected incentive is one or a combination of a coupon, an e-mail, or a marketing message.

16. A computer system, comprising:

one or more processors; and a non-transitory computer-readable storage medium storing computer instructions, when executed by one or more processors, cause the one or more processors to:

access user behavior data and incentive data obtained prior to a current time, wherein the obtained incentive data describes previous incentives offered to users of an online system and the obtained user behavior data describes a degree of user interaction of the users with the online system in response to receiving the previous incentives;

train a behavior prediction model configured to receive user behavior data for a user and an incentive, and further configured to output an incentive prediction using the obtained user behavior data and incentive data, the behavior prediction model configured as a transformer architecture, wherein the instructions to train the behavior prediction model further cause the one or more processors to:

obtain at least a training entry for known user behavior data for a particular user and known incentive data describing contents of incentives the particular user was presented with, and known interaction data describing how the user interacted with the incentives at a later time, compute a loss function indicating a difference between estimated outputs and the known interaction data, wherein the estimated outputs are generated by applying the behavior prediction model to the known user behavior data and the known incentive data, and backpropagating one or more terms obtained from the loss function to update parameters of the behavior prediction model;

receive one or more candidate incentives generated by an incentive generation model for a particular user, wherein the incentive generation model is configured as another transformer architecture;

apply, to each candidate incentive and user behavior data for the particular user, the behavior prediction model to generate an incentive prediction describing a degree of interaction of the particular user with the online system in response to receiving the respective candidate incentive; and transmit, based on the incentive predictions determined for the one or more candidate incentives, instructions to cause display of a selected incentive to the particular user or another user on a client device.

17. The computer system of claim 16, wherein the selected incentive is a candidate incentive from the one or more candidate incentives that is associated with a highest degree of predicted interaction with the online system with respect to a desired objective for the particular user.

18. The computer system of claim 16, wherein the computer instructions further cause the one or more processors to:

access a version of the incentive generation model with a fixed set of parameters;

generate one or more initial incentives using the version of the incentive generation model;

compute a loss function, wherein the loss function includes a first loss indicating a reward for the one or more candidate incentives obtained from the incentive predictions generated by the behavior prediction model, and a second loss indicating a divergence between content of the one or more initial incentives and the one or more candidate incentives; and update the parameters of the incentive generation model
to reduce the loss function.

19. The computer system of claim 16, wherein at least one
or both of the behavior prediction model and the incentive
generation model is configured as a generative transformer
architecture with one or more attention layers.

20. The computer system of claim 16, wherein the incen-
tive prediction for each candidate incentive indicates one or
a combination of an expected frequency of purchase by the
particular user for a time period or a total amount of
purchase by the particular user for a time period.

\* \* \* \* \*